US012609718B2

(12) United States Patent
Patel et al.

(10) Patent No.: US 12,609,718 B2
(45) Date of Patent: Apr. 21, 2026

(54) WiFi-7 OPTIMIZED SPLIT BAND ARCHITECTURE AND METHOD OF OPERATION

(71) Applicant: HEWLETT PACKARD ENTERPRISE DEVELOPMENT LP, Spring, TX (US)

(72) Inventors: Deven Patel, Santa Clara, CA (US); Farhan Hasnain, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 283 days.

(21) Appl. No.: 18/335,006

(22) Filed: Jun. 14, 2023

(65) Prior Publication Data

US 2024/0421834 A1 Dec. 19, 2024

(51) Int. Cl.
| | |
|---|---|
| *H04L 5/22* | (2006.01) |
| *H01Q 1/22* | (2006.01) |
| *H01Q 5/20* | (2015.01) |
| *H04B 1/00* | (2006.01) |

(52) U.S. Cl.
CPC ......... *H04B 1/0057* (2013.01); *H01Q 1/2291* (2013.01); *H01Q 5/20* (2015.01)

(58) Field of Classification Search
CPC .... H04B 1/0057; H04B 1/001; H01Q 1/2291; H01Q 5/20; H04W 72/1215; H04W 72/0457; H04L 5/08; H04L 5/06; H04L 5/02; H01P 1/213; H04J 1/08
See application file for complete search history.

(56) References Cited

U.S. PATENT DOCUMENTS

| | | | |
|---|---|---|---|
| 1,153,181 A | 9/1915 | Steedman | |
| 7,643,848 B2 * | 1/2010 | Robinett | H04W 88/06 |
| | | | 455/550.1 |
| 8,724,753 B2 * | 5/2014 | Demessie | H04B 1/7163 |
| | | | 375/135 |
| 8,906,865 B2 | 12/2014 | Greaves et al. | |
| 9,364,588 B2 | 6/2016 | Ding et al. | |
| 10,075,198 B1 | 9/2018 | Lee et al. | |
| 11,153,181 B1 | 10/2021 | Tsai et al. | |

(Continued)

FOREIGN PATENT DOCUMENTS

| | | |
|---|---|---|
| EP | 1628408 A1 | 2/2006 |
| EP | 3678307 A1 | 7/2020 |

(Continued)

*Primary Examiner* — Phuongchau Ba Nguyen
(74) *Attorney, Agent, or Firm* — Sheppard Mullin Richter & Hampton LLP

(57) ABSTRACT

A system or Access Point having a split band architecture. A first radio communicates with a 6G front end module (FEM) that is connected to a first filter switch bank (FSB) configured to enable a 6G high bandpass filter, a 6G wide bandpass filter, or a 6G narrow bandpass filter. A second radio communicates with a 5G FEM that is connected to a second FSB configured to enable a 6G low bandpass filter, a first 5G low bandpass filter, a 5G wide bandpass filter, or a 5G narrow bandpass filter. A third radio communicates with a 2-5G dual band FEM that is connected to a third FSB configured to enable a 6G full bandpass filter, a 5G high bandpass filter, or a second 5G low bandpass filter. The 2-5G dual FEM may also be connected to a fourth FSB configured to enable a 2G application.

20 Claims, 5 Drawing Sheets

(56) References Cited

U.S. PATENT DOCUMENTS

| | | | | |
|---|---|---|---|---|
| 11,356,127 | B2 * | 6/2022 | Hasnain | H04B 1/44 |
| 11,476,824 | B2 * | 10/2022 | Cai | H04B 1/005 |
| 2009/0130993 | A1 * | 5/2009 | Rofougaran | H04B 1/006 |
| | | | | 455/90.2 |
| 2015/0103663 | A1 * | 4/2015 | Amini | H04L 45/245 |
| | | | | 370/235 |
| 2015/0119115 | A1 * | 4/2015 | Bagger | H03F 3/19 |
| | | | | 455/571 |
| 2015/0303952 | A1 * | 10/2015 | Zeng | H04B 1/006 |
| | | | | 370/297 |
| 2017/0216155 | A1 | 8/2017 | Maloney | |
| 2018/0019831 | A1 * | 1/2018 | Zhang | H04B 1/001 |
| 2018/0152988 | A1 * | 5/2018 | Amini | H04B 1/0057 |
| 2019/0306805 | A1 | 10/2019 | Hasnain et al. | |
| 2019/0312336 | A1 | 10/2019 | Son et al. | |
| 2020/0129638 | A1 | 4/2020 | Van Berkel et al. | |
| 2020/0289650 | A1 | 9/2020 | Deisher et al. | |
| 2021/0067186 | A1 | 3/2021 | Beaudin et al. | |
| 2021/0184707 | A1 | 6/2021 | Hasnain | |
| 2021/0351903 | A1 | 11/2021 | Mori | |
| 2022/0014165 | A1 | 1/2022 | Cai et al. | |
| 2022/0399875 | A1 | 12/2022 | Burra et al. | |
| 2022/0399909 | A1 | 12/2022 | Krishnamachari et al. | |
| 2022/0416836 | A1 | 12/2022 | Rao et al. | |
| 2023/0077767 | A1 | 3/2023 | Beaudin et al. | |
| 2023/0094810 | A1 * | 3/2023 | Robertson | H04W 72/0453 |
| | | | | 370/329 |
| 2023/0144780 | A1 | 5/2023 | Pehlke | |
| 2023/0146310 | A1 | 5/2023 | Pehlke | |
| 2023/0189064 | A1 | 6/2023 | Monajemi et al. | |
| 2023/0223965 | A1 * | 7/2023 | Poulin | H04B 1/006 |
| | | | | 455/269 |
| 2023/0344461 | A1 * | 10/2023 | Sheng | H04B 1/0064 |
| 2024/0048162 | A1 | 2/2024 | Gatta et al. | |
| 2024/0120951 | A1 | 4/2024 | Anderson | |
| 2024/0250701 | A1 * | 7/2024 | Wang | H04B 1/525 |
| 2024/0421834 | A1 * | 12/2024 | Patel | H04B 1/0057 |

FOREIGN PATENT DOCUMENTS

| | | | |
|---|---|---|---|
| GB | 2416625 | A | 2/2006 |
| WO | 2008/001023 | A1 | 1/2008 |
| WO | 2018/031644 | A1 | 2/2018 |
| WO | 2018/064551 | A1 | 4/2018 |
| WO | 2018/193104 | A1 | 10/2018 |
| WO | 2019/221670 | A1 | 11/2019 |
| WO | 2020/146811 | A1 | 7/2020 |
| WO | 2020/249527 | A1 | 12/2020 |
| WO | 2020/249528 | A1 | 12/2020 |
| WO | 2021/133408 | A1 | 7/2021 |
| WO | 2022/139985 | A1 | 6/2022 |
| WO | 2022/200463 | A1 | 9/2022 |

* cited by examiner

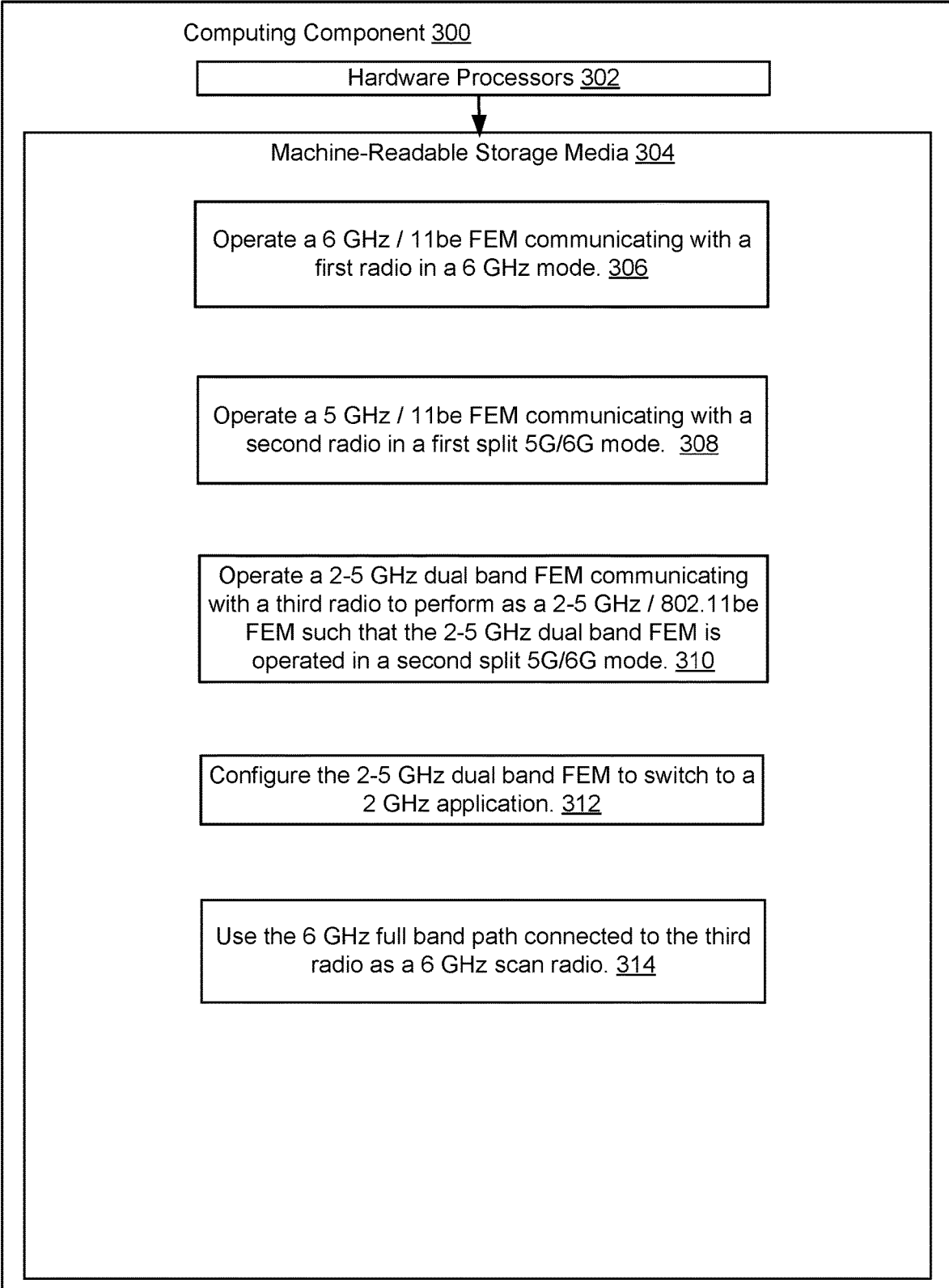

Computing Component 300

Hardware Processors 302

Machine-Readable Storage Media 304

Operate a 6 GHz / 11be FEM communicating with a first radio in a 6 GHz mode. 306

Operate a 5 GHz / 11be FEM communicating with a second radio in a first split 5G/6G mode. 308

Operate a 2-5 GHz dual band FEM communicating with a third radio to perform as a 2-5 GHz / 802.11be FEM such that the 2-5 GHz dual band FEM is operated in a second split 5G/6G mode. 310

Configure the 2-5 GHz dual band FEM to switch to a 2 GHz application. 312

Use the 6 GHz full band path connected to the third radio as a 6 GHz scan radio. 314

FIG. 3

| Mode # | Name | 1st Radio | 2nd Radio | 3rd Radio |
|---|---|---|---|---|
| 1 | UTB (Tri-Band) | 6G FB | 5G FB | 2G FB |
| 2 | Dual Band (+1 Scan) | 6G FB | 5G FB | All Bands Scan |
| 3 | Split 5G | 6G FB | 5G LB | 5G HB |
| 4 | Split 6G (ULL) | 6G HB | 6G LB | 5G FB |
| 5 | Split 6G (ULL) | 6G HB | 6G LB | 2G FB |
| 6 | Split 6G (ULL + Scan) | 6G HB | 6G LB | All Bands Scan |

FIG. 4

WiFi-7 OPTIMIZED SPLIT BAND ARCHITECTURE AND METHOD OF OPERATION

BACKGROUND

The Unlicensed National Information Infrastructure (U-NII) radio band is a part of the unlicensed radio frequency (RF) spectrum used by IEEE 802.11 devices and wireless internet service providers (ISPs) for Wi-Fi communications. Currently, U-NII allocates Wi-Fi channels in the 5 GHz band across four sub-bands: U-NII-1 (5.150 to 5.250 GHZ), U-NII-2 (5.250 GHz to 5.725 GHz), U-NII-3 (5.725 GHz to 5.850 GHZ), and U-NII-4 (5.850 GHz to 5.925 GHZ).

Recently, there have been efforts to include the 6 GHz band for Wi-Fi communications. For instance, it has been proposed to allocate Wi-Fi channels in the 6 GHz U-NII radio band across four sub-bands: U-NII-5 (5.945 to 6.425 GHz), U-NII-6 (6.425 GHz to 6.525 GHZ), U-NII-7 (6.525 GHz to 6.875 GHZ), and U-NII-8 (6.875 GHz to 7.125 GHZ). Such channel allocation in the 6 GHz band would greatly increase the number of available channels for Wi-Fi communications, especially as currently available Wi-Fi bands (e.g., 2.4 GHZ, 5 GHZ) become increasingly congested from usage by ISPs and wireless local area networks (WLANs). Moreover, such channel allocation in the 6 GHz band brings the possibility of higher aggregated throughput across all Wi-Fi bands.

The Institute of Electrical and Electronics Engineers (IEEE) 802.11 communication standards, more commonly referred to as Wi-Fi, specify a set of Medium Access Control (MAC) and physical layer (PHY) protocols for implementing wireless local area network (WLAN) computer communication. The IEEE 802.11 protocol denotes a set of interface standards developed by the IEEE 802.11 committee for short-range communications. For example, the devices that implement the IEEE 802.11 protocol may have both 2.4 GHz and 5 GHz radios for transmitting and receiving data and management frames between devices with similar radio configurations.

Wi-Fi 7 is the successor to Wi-Fi 6/6E and offers 320 MHz bandwidth in the 6 GHz band. Wi-Fi 7 promises to significantly boost the speed and stability of wireless connections while offering lower latency and the ability to seamlessly manage more connections than prior. However, a coexistence problem exists when 6 GHz clients and 5 GHz clients are communicating with the same Access Point (AP) asynchronously.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 3 is an example computing component that may be used to implement various features of examples described in the present disclosure.

FIG. 4 shows a table providing examples of modes that an AP or network device can be operated in according to examples of the present disclosure.

Figure 1:
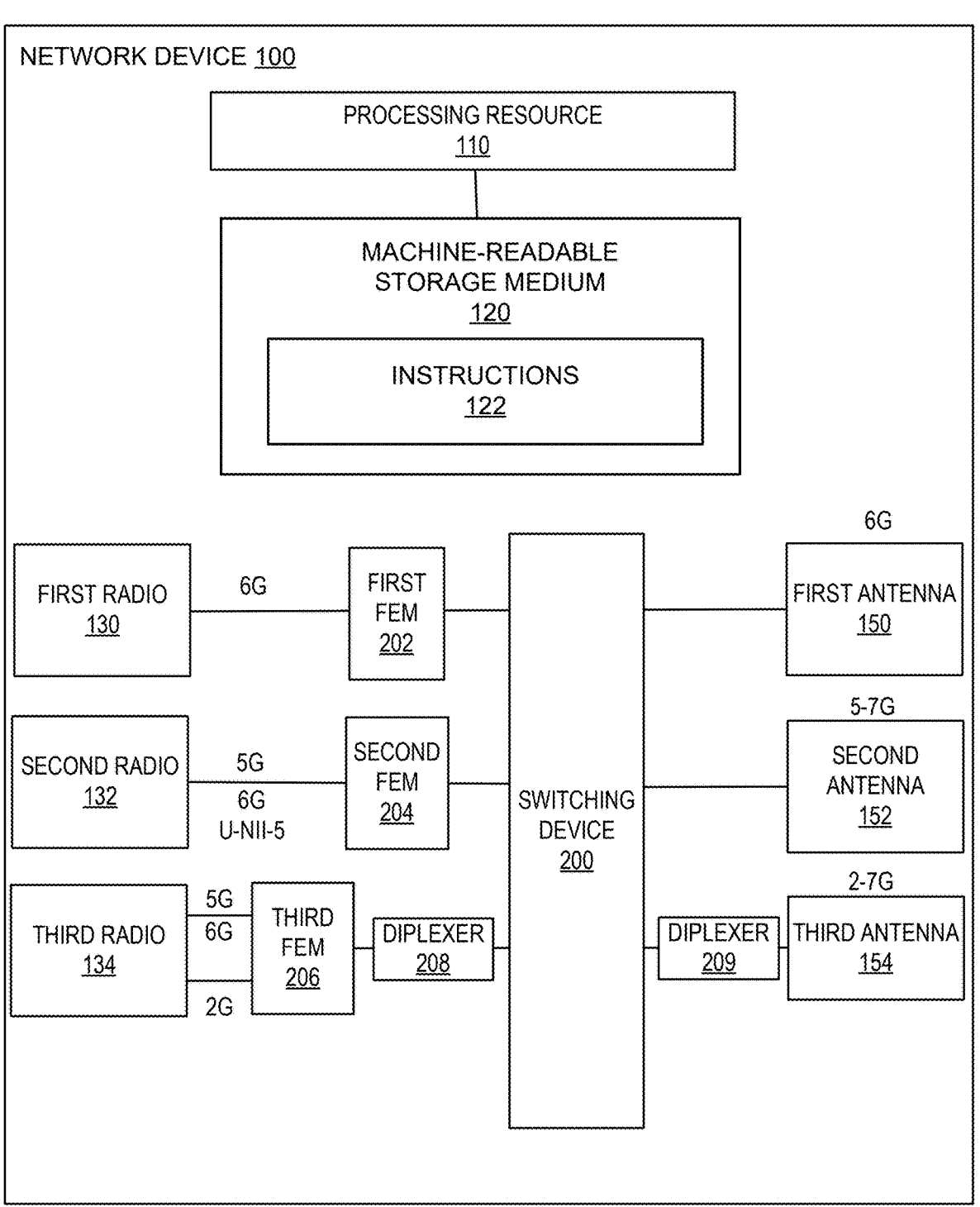
FIG. 1 is a block diagram of a network device for continuous 5 GHz and 6 GHz operation by selective filtering according to an example of the present disclosure

The figures are not exhaustive and do not limit the present disclosure to the precise form disclosed.

DETAILED DESCRIPTION

Examples of the present disclosure provide systems and methods for operating an optimized split-band architecture which can provide (1) continuous 5 GHz and 6 GHz operation by selective filtering, (2) split band operation, (3) an ultra low latency (ULL) mode, and/or (4) smart spectrum scanning.

MLO (Multi-Link Operation) is a significant MAC feature introduced in Wi-Fi 7. MLO enables devices to simultaneously send and receive data across different frequency bands and channels, such as a 2.4 GHz band, a 5 GHz band, and a 6 GHz band. More specifically, MLO is a particular feature of the IEEE 802.11be Extremely High Throughput (EHT) Wi-Fi 7 standard that allows network devices, like APs and client devices, the ability to transmit and receive data from the same traffic flow over multiple radio channels. For example, a first network device (e.g., the AP) may implement multiple radios, like a 2.4 GHz radio and 5 GHz radio, and each of these radios may communicate with a similar or overlapping frequency radios on a second network device (e.g., the client device). Accordingly, multi-link devices (MLDs) may communicate with one another using multiple links (e.g., 2.4 GHZ, 5 GHZ, 6 GHZ). Having multiple links to choose from increases throughput.

Adoption of a 320 MHz channel as part of the IEEE 802.11be standard (WiFi-7) in a 6 GHz band coupled with 160 MHz channels in a 5 GHz band (especially with the allowance of the UNII-4 sub band) has exacerbated the coexistence problem that exists when 6 GHz clients and 5 GHz clients are communicating with the same AP asynchronously. This coexistence problem may have been addressed for 160 MHz channels in UNII-5; however, a new solution is needed to allow 320 MHz operation. 320 MHz channels can be critical not only from a higher physical layer (PHY) rate perspective, but they also offer lower latency as a virtue of higher PHY rate. The PHY rate is the maximum speed that data can move across a wireless link between a wireless client and a wireless router. It is notable that the new 6 GHz band is typically less congested because of a smaller number of devices operating in the new band.

The new 6 GHz band also offers a smart beaconing scheme which can save airtime and allows only IEEE 802.11ax orthogonal frequency-division multiple access (OFDMA) protocol-based communication which was inherently suited to offer lower latency by providing efficient spectral usage (using Resource Units) and scheduling. Such factors can combine to offer even lower latency which is unparalleled in 2.4 GHz and 5 GHz bands. However, offering 320 MHz channels as well as split-band modes (especially, splitting 6 GHz for the new ULL mode) requires addressing intermodulation distortion (IMD) interference and jamming issues.

One solution is to design wide fractional bandwidth steep rejection filters and very high linearity Radio Frequency (RF) switches to realize an RF Front End that can achieve the aforementioned modes. The present disclosure provides inventive ways to offer these modes while keeping the cost low enough to cost-effectively realize such a design.

With the WiFi-7 IEEE 802.11.be standard, key features such as MLO present some new opportunities to dynamically utilize AP radios in a flexible manner to offer such channels amenable to delivering low latency. Also, some differentiation from previous generation Wi-Fi-6E APs is needed as customers will gradually shift their networks over as WiFi-7 becomes more popular among clients and future applications.

The conventional architecture of AP radios typically involves a static configuration of roles/bands for each radio at the time of design, either by the choice of the Front End Module (FEM) or by the choice of the filters. The radios themselves are capable of operating in any of the three Wi-Fi bands currently in use (2 GHZ, 5 GHZ, 6 GHz), but the transmission (TX) power requirements for range and the filtering specifications for simultaneous adjacent band operation may narrow the choices for what can be used on the front end of the radios.

For any radio pair to operate in the same or adjacent band, proper filtering protection should be inserted inline. Switched Filter Banks (SFBs) have been used for dynamic configurability, but as the number of poles increases on such switched filter banks, combined with high rejection requirements at close adjacent frequencies of the filters on such banks, the linearity requirements increase for such switches. To cover the entire range of 5 GHz and 6 GHz band with a common FEM is challenging and vendors will often times only make medium or low power versions of these devices to suit the client or low-end AP market.

Technical improvements are realized throughout the disclosure. For example, by virtue of the features of the present disclosure, the above-noted coexistence problem that exists when 6 GHz clients and 5 GHz clients are communicating with the same AP asynchronously for 320 MHz channels can be addressed. Examples of the present disclosure result in a re-design of the filters and architecture to allow for 320 MHz operation and basic Wi-Fi 7 in all bands. One notable feature of this approach lies in the switched filter bank configuration and operation, i.e., the choice of filters and how the filters operate-their split operation-combined with the front end. Examples of the present disclosure provide extra switched paths to enable other filter transition possibilities and split in-band operation or cross-band capabilities. Simply adding extra paths for such highly selective filters is not easy to do, one reason being that the effect of the filter can be undone if the linearity of the switch itself is not adequately factored in. Conventional Radio Frequency (RF) switch offerings for more than two poles don't offer the requirements needed for this application unless the technology were to move up to a higher class of switch (e.g., military grade or radar applications), but that would still not be cost effective for commercially deployable electronics. One example of the disclosed technology is a three radio approach to an AP. Examples of the present disclosure can improve latency.

The present disclosure according to one example provides a non-transitory machine-readable medium storing instructions that, when executed, cause a processor to operate a network device, the instructions causing the processor to operate a 6 GHZ front end module communicating with a first radio in a 6 GHz mode or a first split 5 GHZ/6 GHz mode. The instructions further cause the processor to operate a 5 GHz front end module communicating with a second radio in a 5 GHz mode, the first split 5G/6G mode, or a second split 5 GHZ/6 GHz mode. The instructions further cause the processor to operate a 2-5 GHZ dual band front end module communicating with a third radio to perform as a 2-5 GHZ/802.11be front end module such that the 2-5 GHZ dual band front end module is operated in a 2 GHz mode, the second split 5G/6G mode, or a scan radio mode. The instructions may further cause the processor to: configure the 2-5 GHZ dual band front end module to switch to the 2 GHz.

The present disclosure according to another example provides a system having a split band architecture. The system includes a first radio communicating with a 6G front end module (FEM) that is connected to a first filter switch bank (FSB) configured to enable a 6 GHz high bandpass filter, a 6 GHz wide bandpass filter, or a 6 GHz narrow bandpass filter. A second radio communicates with a 5 GHz front end module that is connected to a second filter switch bank configured to enable a 6 GHz low bandpass filter, a first 5 GHz low bandpass filter, a 5 GHz wide bandpass filter, or a 5 GHz narrow bandpass filter. A third radio communicates with a 2-5 GHZ dual band front end module that is connected to a third filter switch bank configured to enable a 6 GHz full band path, a 5 GHz high bandpass filter, or a second 5 GHz low bandpass filter. The 2-5 GHZ dual front end module may also be connected to a fourth filter switch bank configured to enable a 2 GHz application. The system may be an Access Point (AP).

In examples, the 6 GHz front end module and the 5 GHz front end module each comply with the IEEE 802.11be standard. The 6 GHz low bandpass filter may range up to 500 MHz for a low 6G application. The 6G narrow bandpass filter may range up to 320 MHz. The 2-5 GHZ dual band front end module may be configured to use the 6 GHZ full band path as a 6 GHz scan radio. The 6 GHz front end module may be configured to be operated in a 6 GHz mode using the 6 GHz high bandpass filter, the 6 GHz wide bandpass filter, or the 6 GHz narrow bandpass filter. The 5 GHz front end module may be configured to be operated in a first split 5G/6G mode, such that operating in the 5 GHZ mode uses the first 5 GHz low bandpass filter, the 5 GHz wide bandpass filter, or the 5 GHz narrow bandpass filter, and operating in the 6 GHz mode uses the 6 GHz low bandpass filter for a low 6 GHz application.

The 2-5 GHZ dual band front end module may be configured to perform as a 2-5 GHz 802.11be front end module such that the 2-5 GHZ dual band front end module is operated in a second split 5G/6G mode, in which operating in the 5 GHz mode uses the 5 GHz high bandpass filter or the second 5 GHz low bandpass filter, and operating in the 6G mode uses the dedicated 5 GHz receive path from the third radio to the 2-5 GHZ dual band front end module to receive using the 6 GHz fullband path.

The present disclosure according to another example provides a method of operating a network device. The method includes operating a 6 GHz front end module communicating with a first radio in a 6 GHz mode using a 6 GHz high bandpass filter, a 6 GHz wide bandpass filter, or a 6 GHz narrow bandpass filter. The method also includes operating a 5 GHz front end module communicating with a second radio in a first split 5G/6G mode, such that operating in the 5 GHz mode includes using a first 5 GHz low bandpass filter, a 5 GHz wide bandpass filter, or a 5 GHz narrow bandpass filter, and operating in the 6 GHz mode includes using a 6 GHz low bandpass filter for a low 6 GHz application. The method also includes operating a 2-5 GHz dual band front end module communicating with a third radio to perform as a 2-5 GHz 802.11be front end module such that the 2-5 GHZ dual band front end module is operated in a second split 5G/6G mode, in which operating in the 5 GHz mode includes using a 5 GHz high bandpass filter or a second 5 GHz low bandpass filter, and operating in the 6 GHz mode includes configuring a dedicated 5 GHz receive path from the third radio to the 2-5 GHZ dual band front end module to receive using a 6 GHz full band path. The method may also include configuring the 2-5 GHZ dual band front end module to switch to a 2 GHz application. The method may also include using the 6 GHz full band path connected to the third radio as a 6 GHz scan radio. In examples the 5 GHz front end module and the 6 GHz front end module each comply with the IEEE 802.11be standard.

The present disclosure according to another example provides a non-transitory machine-readable medium, storing instructions that, when executed, cause a processor to operate a split-band architecture, the instructions causing the processor to: (1) operate a 6 GHz front end module communicating with a first radio in a 6 GHz mode using a 6 GHz high bandpass filter, a 6 GHz wide bandpass filter, or a 6 GHz narrow bandpass filter; (2) operate a 5 GHz front end module communicating with a second radio in a first split 5G/6G mode, such that operating in the 5 GHz mode includes using a first 5 GHz low bandpass filter, a 5 GHz wide bandpass filter, or a 5 GHz narrow bandpass filter, and operating in the 6 GHz mode includes using a 6 GHz low bandpass filter for a low 6 GHz application; and (3) operate a 2-5 GHZ dual band front end module communicating with a third radio to perform as a 2-5 GHz 802.11be front end module such that the 2-5 GHZ dual band front end module is operated in a second split 5G/6G mode, in which operating in the 5 GHz mode includes using a 5 GHz high bandpass filter or a second 5 GHz low bandpass filter, and operating in the 6 GHz mode includes configuring a dedicated 5 GHz receive path from the third radio to the 2-5 GHZ dual band front end module to receive using a 6 GHz full band path.

Figure 2:
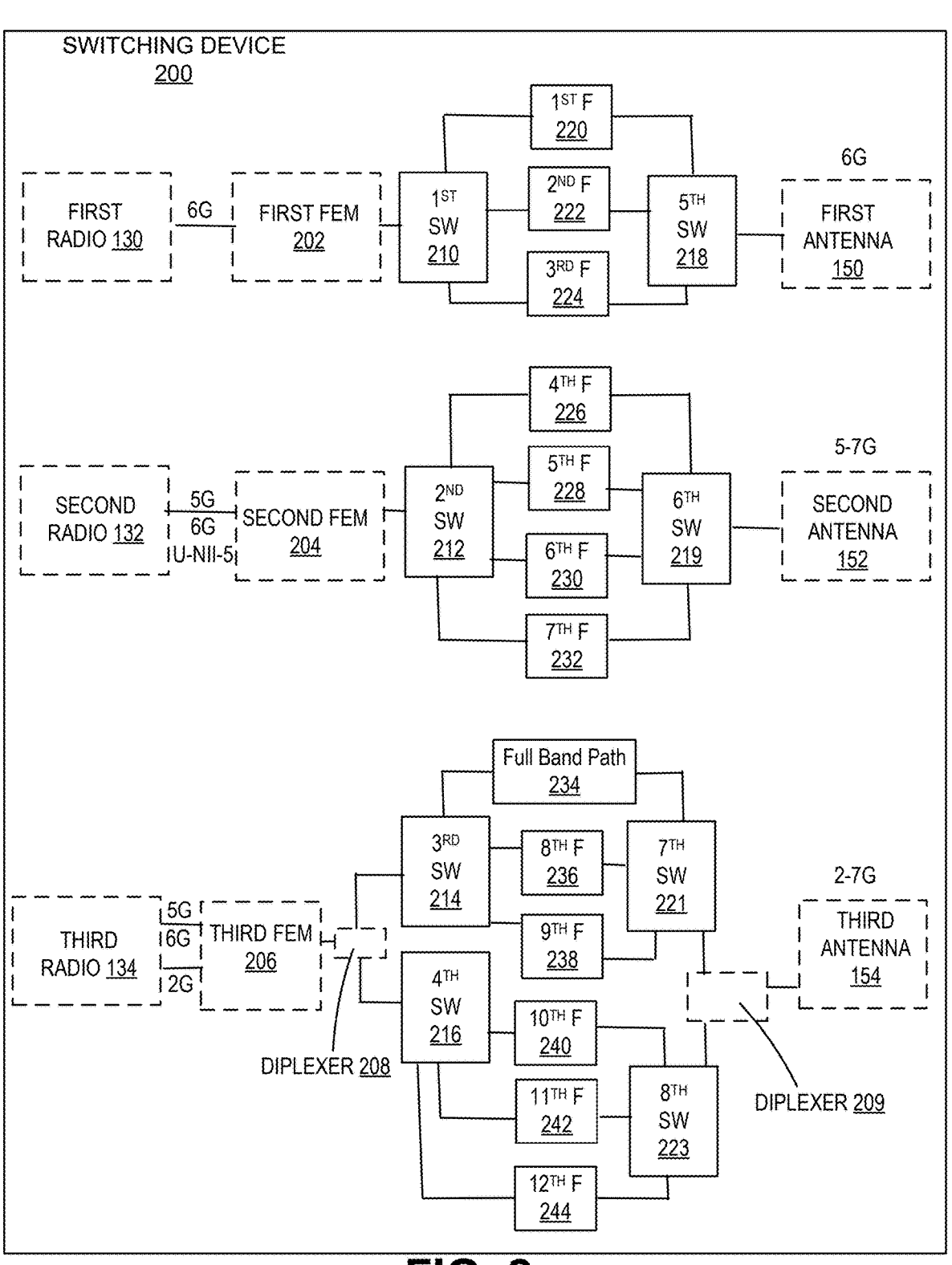
FIG. 2 is a block diagram of a switching device for selective filtering for continuous 5 GHz and 6 GHz operation according to an example of the present disclosure.

FIGS. 1 and 2 together comprise a system, architecture, or network device 100 according to an example of the present disclosure. The network device 100 may be for example an AP W-Fi front end. More particularly, FIG. 1 is a block diagram of a network device 100 for (1) continuous 5 GHZ and 6 GHz operation, (2) split band operation, (3) an ultra low latency (ULL) mode, and/or (4) smart spectrum scanning by selective filtering, according to an example of the present disclosure. Network device 100 includes at least one processing resource 110 and at least one machine-readable medium 120 comprising (e.g., encoded with) at least instructions 122 that are executable by the at least one processing resource 110 of network device 100 to implement functionalities described herein in relation to instructions 122.

In the example of FIG. 1, network device 100 may engage in any network data transmission operations, including, but not limited to, switching, routing, bridging, or any combination thereof. In some examples, network device 100 may comprise a Wireless Access Point (WAP) or Access Point (AP). In examples described herein, a WAP generally refers to receiving points for any known or convenient wireless access technology which may later become known. Specifically, the term WAP is not intended to be limited to WAPs which conform to IEEE 802.11 standards. A WAP generally functions as an electronic device that is adapted to allow wireless devices to connect to a wired network via various communications standards. A WAP may include any necessary hardware components to perform the inventions disclosed herein, including, but not limited to: processors, memories, display devices, input devices, communications equipment, etc. It will be understood by one of ordinary skill in the art that network device 100 may be any suitable type(s) of network devices made by any suitable manufacturer(s).

In the example of FIG. 1, network device 100 includes a first radio 130, a second radio 132, and a third radio 134. In some examples, each of first radio 130, the second radio 132, and the third radio 134 may operate at one or more frequency bands which conform one or more IEEE standards (e.g., 802.11ax). In some examples, the first radio 130 may operate at one or more channels in the 6-7 GHz band. For instance, the first radio 130 may operate at one or more channels across the U-NII-5, U-NII-6, U-NII-7, and U-NII-8 sub-bands In some examples, the second radio 132 may operate at one or more channels in the 5 GHz or 6 GHz bands. For instance, the second radio 132 may operate at one or more channels across the proposed U-NII-1, U-NII-2, U-NII-3, U-NII-4, and U-NII-5 sub-bands. It will be understood by one skilled in the art that the first radio 130, the second radio 132, and the third radio 134 may operate at any suitable frequency band(s) and conform to any suitable type(s) of wireless communication standards, now known or later developed. Moreover, although FIG. 1 shows network device 100 comprising three radios, it will be understood by one skilled in the art that network device 100 may comprise any suitable number of radios.

In the example of FIG. 1, network device includes a first antenna 150, a second antenna 152, and a third antenna 154. In some examples, each of first antenna 150, second antenna 152, and third antenna 154 may transmit and/or receive directional signals, omnidirectional signals, or a combination thereof. In examples described herein, a "directional" signal refers to a signal which radiates more strongly in one or more directions as compared to one or more other directions along an azimuth plane (i.e., horizontal plane), whereas an "omnidirectional" signal refers to a signal which radiates equally in all directions along an azimuth plane. In some examples, each of first antenna 150, second antenna 152, and third antenna 154 may comprise a phased array antenna. In examples described herein, a "phased array antenna" refers to an array of antenna elements which can create a directional signal which can be electronically steered to point in different directions without moving the antenna elements. In such examples, a phased array antenna may comprise an array of directional and/or omnidirectional antenna elements which can focus (i.e., transmit, receive) RF energy in specific spatial directions. It will be understood by on skilled in the art that first antenna 150, second antenna 152, and third antenna 154 may comprise any suitable type(s) of antennas, now known or later developed. Moreover, although FIG. 1 shows network device 100 comprising three antennas, it will be understood by one skilled in the art that network device 100 may comprise any suitable number of antennas.

In the example of FIG. 1, network device 100 includes a filter switch bank (FSB) or switching device 200. In some examples, switching device 200 may be connected to first radio 130, second radio 132, third radio 134, first antenna 150, second antenna 152, and third antenna 154. In some examples, switching device 200 may comprise one or more switches which are connected to one or more of first radio 130, second radio 132, third radio 134, first antenna 150, second antenna 152, and third antenna 154. In some examples, the switching device 200 may comprise one or more filters which are connected to one or more of first radio 130, second radio 132, third radio 134, first antenna 150, second antenna 152, and third antenna 154.

In the example of FIG. 1, first radio 130 is connected to switching device 200 through a first front end module FEM 202. Second radio 132 is connected to switching device 200 through a second FEM 204. Third radio 134 is connected to switching device 200 through a diplexer 208 and a third FEM 206. A diplexer 209 is also disposed between third antenna 154 and switching device 200. In some examples an RTC8613MU component may be part of switching device 200; an RTC8613MU component is a Single Pole Triple Throw (SP3T) RF switch to select between different filters.

In the example of FIG. 1, instructions 122 may be configured to receive a first signal in one of a 5 GHz band and a 6 GHz band. In some examples, first signal may be received by first antenna 150 of network device 100. In the example of FIG. 1, instructions 122 may be configured to generate a second signal in the other one of the 5 GHz and 6 GHz bands. In some examples, the second signal may be generated by second radio 132 of network device 100, wherein second radio 132 operates at the other one of the 5 GHz and 6 GHz bands.

FIG. 2 is a block diagram of switching device 200 for selective filtering for continuous 5 GHz and 6 GHz operation according to an example of the present disclosure. By virtue of the features of the present disclosure, selective filtering for continuous 5 GHz and 6 GHz operation can be achieved including for 320 MHz channels or operation. Switching device 200 includes a first switch 210, a second switch 212, a third switch 214, a fourth switch 216, a fifth switch 218. a sixth switch 219, a seventh switch 221, and an eighth switch 223. In addition, switching device 200 includes a first filter 220, a second filter 222, a third filter 224, a fourth filter 226, a fifth filter 228, a sixth filter 230, a seventh filter 232, a full band path 234, an eighth filter 236, a ninth filter 238, a tenth filter 240, an eleventh filter 242, and a twelfth filter 244. In some examples a first filter switch bank (FSB) may comprise the filters and switches in line with the first radio 130, a second FSB may comprise the filters and switches in line with the second radio 132, and a third FSB may comprise the filters and switches in line with the third radio 134. Other example structures may readily be contemplated.

In the example of FIG. 2, first switch 210, third switch 214, fourth switch 216, fifth switch 218, seventh switch 221, and eighth switch 223 may comprise a single-pole, triple-throw (SP3T) switch. Second switch 212 and sixth switch 219 may comprise a single-pole, quadruple-throw (SP4T) switch. Other single-pole, multi-throw switches may be suitable depending on the architecture. It will be understood by one skilled in the art that the switches 210-223 may comprise any suitable type(s) of switches, now known or later developed. Also in the example of FIG. 2, each of the filters 220-244 may comprise a low temperature co-fired ceramic (LTCC) filter, a dielectric cavity resonance (DR) filter, a surface acoustic wave (SAW) filter, a bulk acoustic wave (BAW) filter, other filters, or a combination thereof. It will be understood by one skilled in the art that the filters 220-244 may comprise any suitable type(s) of filters, now known or later developed.

In the example of FIG. 2, switching device 200 may be connected to a network device. In some examples, switching device 200 may be connected to switches and filters of the network device 100. In some examples, first switch 210 may be connected to first radio 130 of network device 100 through first front end module (FEM) 202. Second switch 212 may be connected to second radio 132 of network device 100 through second FEM 204. Third switch 214 and fourth switch 216 may be connected to third radio 134 of network device 100 through diplexer 208 and third FEM 206.

Fifth switch 218 may be connected to first antenna 150 of network device 100, sixth switch 219 may be connected to second antenna 152 of network device 100. Seventh switch 221 and eighth switch 223 may be connected to third antenna 154 through diplexer 209.

First, second, and third filters 220, 222, 224 are connected to first and fifth switches 210, 218. Fourth through seventh filters 226, 228, 230, 232 are connected to second and sixth switches 212, 219. The full band through path 234 is connected to the third and seventh switches 214, 221. Eighth and ninth filters 236, 238 are connected to third and seventh switches 214, 221. Tenth through twelfth filters 240, 242, 244 are connected to fourth and eighth switches 216, 223.

In an example of the present disclosure, first radio 130 is a 6-7 GHZ radio, second radio 132 is a 5-7 GHz radio, and third radio 134 is a 2-7 GHz radio. The first FEM 202 is a 6 GHZ, 11 be FEM. The second FEM 204 is a 5 GHz 11be FEM, and the third FEM 206 is a 2-5 GHZ dual band FEM that is operating as a 2-5 GHz 11be "capable" FEM.

The first, second, and third FEMs 202, 204, 206 can communicate with central processing unit (CPU) or processing resource 110 via a Peripheral Component Interconnect Express (PCIe) bus. PCIe as known in the art is a high speed serial computer expansion bus standard. As one example implementation, a PCIe 3.0 bus can connect the first and second radios 130, 132, while a PCIe 2.0 bus can connect the third radio 134; of course, the invention is not limited to this example, and any suitable bus can operate with the system architecture disclosed herein.

The first radio 130 can generate signals including in the 6 GHz band, e.g., the U-NII-5, U-NII-6, U-NII-7, or U-NII-8 sub-bands. The first antenna 150 can send or receive signals in the 6 GHz band. The first switch 210 or the fifth switch 218 can select or enable any of the first, second, or third filters 220, 222, 224 to be applied to the signals in the 6 GHz band. The first filter 220 allows a 6 GHz high band signal to pass (6G HB), the second filter 222 allows a 6 GHz wide band signal to pass (6G WB), and the third filter 224 allows a 6 GHz narrow band signal to pass (6G NB). The 6G HB signal may for example be allocated in the U-NII 7 or U-NII-8 sub-bands. 6G NB is lower 320 MHz of UNII-5 and 6G WB and upper 160 MHz of UNII-5, UNII-6/7/8 sub-bands.

The second radio 132 is a 5-7 GHz radio (e.g., 5150 to 7125 MHz) and can generate signals including in the 5 GHz band or the low 6 GHz band. The low 6 GHz band is the U-NII-5 sub-band. The second radio 132 can do all of the 5 GHz band and UNII-5 from the 6 GHz band. The second antenna 152 is a 5-7 GHz antenna and thus can send or receive signals in the 5-7 GHz bands. The second switch 212 or the fourth switch 219 can select or enable any of the fourth, fifth, sixth, or seventh filters 226, 228, 230, 232 to be applied to the signals in the 5 GHz or low 6 GHz bands. The fourth filter 226 allows a 6 GHz low band signal to pass (6G LB), the fifth filter 228 allows a 5 GHz low band signal to pass (5G LB), the sixth filter 230 allows a 5 GHz wide band signal to pass (5G WB), and the seventh filter 232 allows a 5 GHz narrow band signal to pass (5G NB). The 6G LB signal may for example be allocated to the U-NII-5 sub-band. The 5G LB signal may for example be allocated to the U-NII-1 sub-band or the U-NII-2A (5.250-5.350) sub-band. 5G WB is UNII-1/2A/2C and 5G NB is UNII-3/4.

The third radio 134 is a 2-7 GHz radio and can generate signals including signals in the 2 GHz band, the 5 GHz band, or the 6 GHz band. The third antenna 154 is a 2-7 GHz antenna and thus can send or receive signals in the 2-7 GHz bands. The third switch 214 can select or enable any of the full band path 234 or the eighth or ninth filters 236, 238 to be applied to the signals in the 5 GHz or 6 GHz bands. The full band through path 234 allows a 6 GHz full band signal to pass (6G FB), the eighth filter 236 allows a 5 GHz high band signal to pass (5G HB), and the ninth filter 238 allows a 5 GHz low band signal to pass (5G LB). The 5G HB signal may for example be allocated to the U-NII-2C (5.470-5.725), 3, or 4 sub-bands. The tenth filter 240 (allowing channels 1, 6 in 2.4 GHZ), the eleventh filter 242 (allowing channel 11 in 2.4 GHZ), and the twelfth filter 244 (allowing all 2.4 GHz channels) enable a 2 GHz application. As explained below, the third FEM 206 is a 2-5 GHZ dual band FEM that is operating as a 2-5 GHz 11be "capable" FEM.

Network Device Operation

As noted above, the AP Wi-Fi RF Front End or network device 100 architecture of the example of FIGS. 1 and 2 provides three radios: first radio 130 (6-7 GHz), second radio 132 (5-7 GHZ), and third radio 134 (2-7 GHZ). First radio 130 is connected to a first FEM 202 (6 GHZ/11be) which is connected to a filter switch bank comprising first switch 210 and fifth switch 218, each having three switches to one of a first filter 220 (6 GHz HB), a second filter 222 (6 GHZ WB), and a third filter 224 (6 GHZ NB).

Second radio 132 is connected to a second FEM 204 (5 GHZ/11be). One notable feature of second radio 132 lies in the addition of a 6 GHZ LB filter (fourth filter 226) that can be switched to from the second switch 212 (a four-branch FSB), even though the 5 GHZ/11be FEM (second FEM 204) is not specifically designed to support 6 GHz. Nevertheless, second FEM 204 can be used in the example of FIG. 2 for low 6 GHz applications when switched to by the second switch 212 of this design, potentially sacrificing some performance to do so. In the example of FIG. 2, the way the filters are divided among the radios with the configuration/architecture of switch/filter legs as shown can allow some of the radios to operate across wider than designed frequency bands of operation in a unique way. Second radio 132 can reasonably operate into the first 500 MHz of the U-NII-5 6 GHz band despite using a dedicated 5 GHZ FEM (second FEM 204). Accordingly, second radio 132 is connected through a FSB with four switches (second switch 212) to one of 6 GHZ LB, 5 GHZ LB, 5 GHZ WB, and 5 GHz NB.

There are dual band FEMs currently available that span the entire range of 5 GHz and 6 GHz; however, one compromise is that they are lower in power to cover such a wide band of operation and are currently only available in a generation older technology, 802.11ax. Matching and biasing a power amplifier (PA) to cover such a wide range can be difficult to achieve at higher powers and is not a matter of priority for FEM vendors. With the much stricter demand for 802.11be error vector magnitude (EVM) and the need for higher power for an AP or network device, combined with typical tri-band APs not needing such level of configurability, FEM manufacturers are not likely to be building any such high-power wide band 802.11be FEMs anytime soon.

Accordingly, as a further comment on second radio 132, one notable application of the example structure of FIG. 2 is to use an existing 5 GHZ FEM (second FEM 204) and push it into 6 GHz operation only when split 6 GHz mode is used (through the fourth filter 226). Characterizing the 5 GHZ FEM (second FEM 204) into 6 GHz may result in some loss in performance in 6 GHZ, but often times it is the higher end of 6 GHz that is difficult to match for a wideband FEM, with only a limited (and significantly less) loss in performance in 6 GHZ LB for a 5 GHz-optimized FEM. This is a compromise in that split 6 GHz applications would be more commonly used in high density applications where a reduction in power will suit itself such that second radio 132 operating a few decibel (dB) below where a standalone 6 GHz radio would be is acceptable. Accordingly, the 6 GHz LB filter (fourth filter 226) is strategically located on second radio 132 and can complement the 5 GHz radio well.

As an example, the network device 100 and the switching device 200 of FIGS. 1 and 2 can operate in split 6 GHz mode in which first radio 130 is 6 GHZ HB and second radio 132 is 6 GHz LB. The network device 100 and the switching device 200 can also operate in ULL mode, which is a specific case of split 6 GHz model in which first radio 130 is 6 GHz HB (on a 320 MHz channel) and second radio 132 is 6 GHz LB (on a 320 MHz channel). The network device 100 and the switching device 200 can also operate in split 5 GHz mode in which second radio 132 is 5 GHz LB and third radio 134 is 5 GHz HB.

Similarly, the split 5 GHz option is shared between second radio 132 and third radio 134, where on third radio 134 a 2G/5G Dual Band FEM (third FEM 206) is used. Additionally, the low-noise amplifier (LNA) (receive RX operation) in such FEMs are an inherently wider band and not subject to the same limitations as the power amplifier (transmission TX operation). Thus, the configuration shown on third radio 134 with Dual 2G/5G FEM can also be used for 6 GHz RX for the purposes of a scan radio. The SFB (Switch Filter Bank) on third radio 134 (i.e., third and fourth switches 214, 216) with six branches uniquely combines Advanced IoT Coexistence (AIC) 2 GHz split band filtering for IoT coexistence, full 5 GHz operation, and 6 GHz RX, with a single Dual Band FEM (third FEM 206). The current 802.11ax generation of such Dual Band FEMs can even meet the 802.11be requirements for EVM. AIC for example requires tenth and eleventh filters 240, 242 with fourth and eighth switches 216, 223.

A notable feature of third radio 134 according to an example of the present disclosure is that it is connected to a 2-5 GHZ dual band FEM (third FEM 206) that acts as a 2-5 GHZ/11be "capable" FEM. This enables 5 GHz to operate in split mode, which is another feature of this design. There are two SFBs in line with third radio 134, i.e., third switch 214 and fourth switch 216, each with three branches. Third switch 214 switches to one of 6 GHZ FB, 5 GHZ HB, and 5 GHZ LB; fourth switch 216 switches to a 2G application. Third FEM 206 is designed for the previous generation (Wi-Fi-6/6E) but in this example is being applied to WiFi-7, as there is no Wi-Fi-7 dual band FEM currently. Accordingly the example of FIG. 2 uses only one dual band FEM as "capable." The example of FIG. 2 dedicates a 5 GHz receive path to receive in the new 6 GHz band (6 GHz FB), via splitting 5 GHz operation and 6 GHz operation. The example of FIG. 2 can also use the 6 GHz FB as a 6 GHz scan radio (using the 5 GHz low noise amplifier of third FEM 206) without sacrificing much if any performance.

All together this architecture can provide classic tri-band operation with full channel combination choice, in addition to split 5 GHz or split 6 GHz operation (including the ULL mode), or a dedicated scan radio that covers all three bands with levels of protection from jamming from the serving radios. A 2 GHz application can be provided as well. By virtue of the features of the present disclosure, this architecture can enable all of these functions with moderately little cost increase and with minimization of FEMs extending the existing performance limitations of the FEMs in a unique way that such performance loss would not limit the intended application.

FIG. 3 is an example computing component 300 that may be used to implement various features of continuous 5 GHz and 6 GHz operation by selective filtering according to an example of the present disclosure, for example operating a split band architecture such as the configuration of network device 100 shown in FIG. 2. Network device 100 may be an AP. By virtue of the features of FIG. 3, selective filtering for continuous 5 GHz and 6 GHz operation can be achieved including for 320 MHz channels or operation. Further, split band operation, an ultra low latency (ULL) mode, and/or smart spectrum scanning can also be achieved.

Computing component 300 may be, for example, a server computer, a controller, or any other similar computing component capable of processing data. Computing component 300 may be resident on the network device 100 or may be a server computer, controller, or other similar computing component external to but in communication with the network device 100. In the example implementation of FIG. 3, the computing component 300 includes a hardware processor 302 and machine-readable storage medium for 304.

Hardware processor 302 may be one or more central processing units (CPUs), semiconductor-based microprocessors, and/or other hardware devices suitable for retrieval and execution of instructions stored in machine-readable storage medium 304. Hardware processor 302 may fetch, decode, and execute instructions, such as instructions 306-314, to control processes or operations for implementing the various features of FIG. 3. As an alternative or in addition to retrieving and executing instructions, hardware processor 302 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 304, may be any electronic, magnetic, optical, or other physical storage device that contains or stores executable instructions. Thus, machine-readable storage medium 304 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 304 may be a non-transitory storage medium, where the term "non-transitory" does not encompass transitory propagating signals. As described in detail below, machine-readable storage medium 304 may be encoded with executable instructions, for example, instructions 306-314.

Hardware processor 302 may execute instruction 306 to operate a 6 GHz/11be FEM communicating with a first radio in a 6 GHz mode. The 6 GHZ/11be FEM may be for example first FEM 202 of FIG. 2. The first radio may be for example first radio 130 of FIG. 2. Operating in the 6 GHz mode includes using a 6 GHz high bandpass filter, a 6 GHz wide bandpass filter, or a 6 GHz narrow bandpass filter.

Hardware processor 302 may execute instruction 308 to operate a 5 GHz/11be FEM communicating with a second radio in a first split 5G/6G mode. The 5 GHZ/11be FEM may be for example second FEM 204 of FIG. 2. The second radio may be for example second radio 132 of FIG. 2. Operating in the 5 GHz mode includes using a first 5 GHz low bandpass filter, a 5 GHz wide bandpass filter, or a 5 GHz narrow bandpass filter. Operating in the 6 GHz mode includes using a 6 GHz low bandpass filter for a low 6 GHz application. A low 6 GHz application in one example is an application up to 500 MHz.

Hardware processor 302 may execute instruction 310 to operate a 2-5 GHz dual band FEM communicating with a third radio to perform as a 2-5 GHZ/802.11be FEM such that the 2-5 GHZ dual band FEM is operated in a second split 5G/6G mode. The 2-5G dual band FEM may be for example third FEM 206 of FIG. 2. The third radio may be for example third radio 134 of FIG. 2. Operating in the 5 GHz mode includes using a 5 GHz high bandpass filter or a second 5 GHz low bandpass filter, and operating in the 6 GHz mode includes configuring a dedicated 5 GHz receive path from the third radio to the 2-5 GHZ dual band FEM to receive using a 6 GHz full band path.

Hardware processor 302 may execute instruction 312 to configure the 2-5 GHz dual band FEM to switch to a 2 GHz application.

Hardware processor 302 may execute instruction 314 to use the 6 GHz full band path connected to the third radio as a 6G scan radio.

FIG. 4 shows a table providing examples of modes that an AP or network device such as network device 100 of FIG. 1 or computing component 300 of FIG. 3 using switching device 200 of FIG. 2 can be operated in according to examples of the present disclosure. The Table in FIG. 4 shows six example operating modes, numbered 1 through 6. The Table also shows how the first, second, and third radios 130, 132, 134 can be configured in order to effect the various operating modes. For example, in order to effect the UTB (Tri-Band) mode, the first radio 130 operates at 6 GHz FB, the second radio 132 operates at 5 GHZ FB, and the third radio 134 operates at 2 GHz FB. Of course, the present disclosure is not limited by or to the examples disclosed in the Table.

Figure 5:
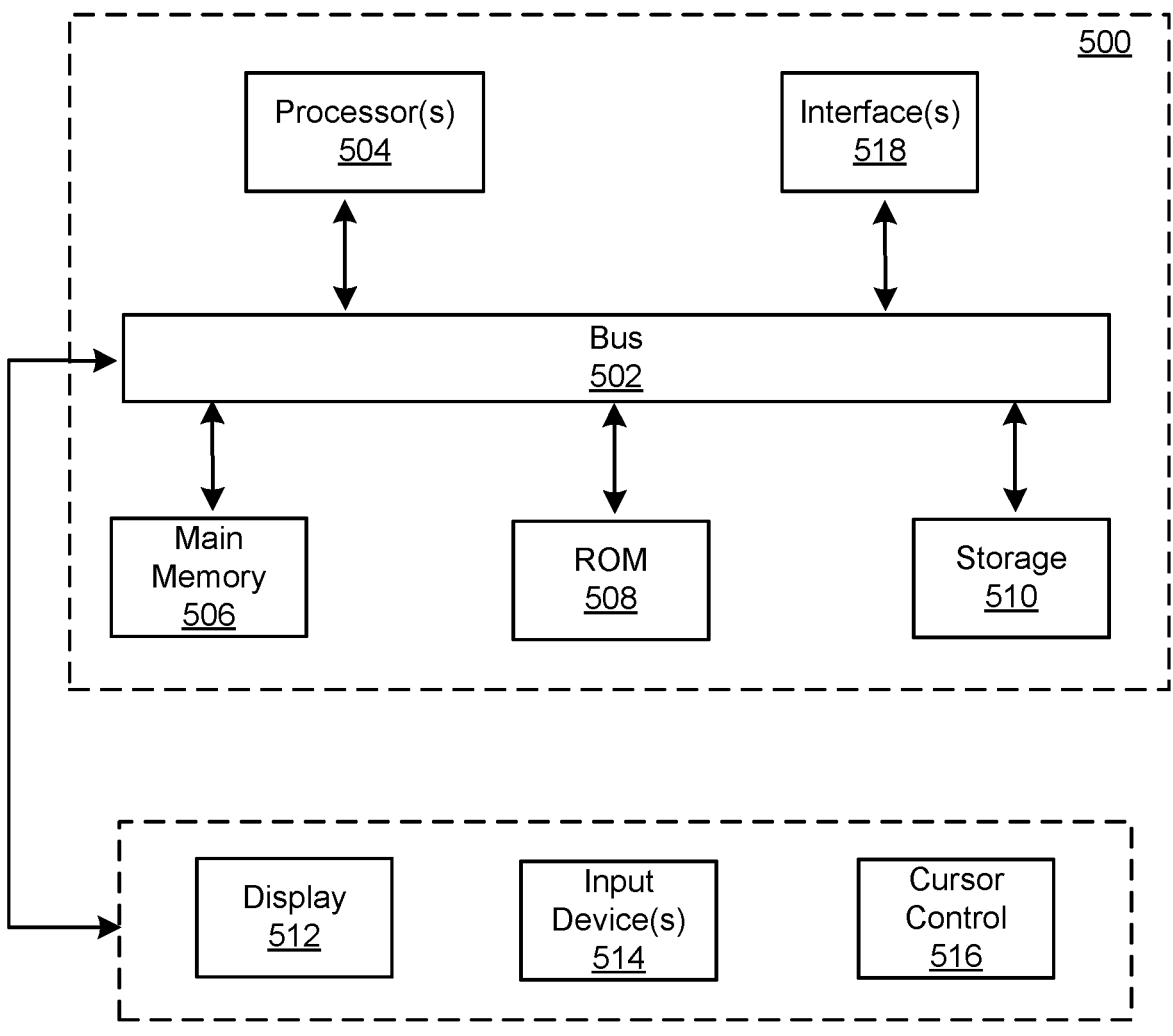
FIG. 5 depicts a block diagram of an example computer system in which various of the embodiments described herein may be implemented.

FIG. 5 depicts a block diagram of an example computer system 500 in which various of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 404, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALS, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A non-transitory machine-readable medium storing instructions that, when executed, cause a processor to operate a network device, the instructions causing the processor to:

operate a 6G front end module communicating with a first radio in a 6G mode or a first split 5G/6G mode, wherein the 6G front end module is connected to a first filter switch bank configured to enable a 6G high bandpass filter, a 6G wide bandpass filter, or a 6G narrow bandpass filter;

operate a 5G front end module communicating with a second radio in a 5G mode, the first split 5G/6G mode, or a second split 5G/6G mode, wherein the 5G front end module is connected to a second filter switch bank configured to enable a 6G low bandpass filter, a first 5G low bandpass filter, a 5G wide bandpass filter, or a 5G narrow bandpass filter; and operate a 2-5G dual band front end module communicating with a third radio to perform as a 2-5G/802.11be front end module by configuring the 2-5G dual band front end module to switch to operating in a 2G mode, the second split 5G/6G mode, or a scan radio mode, wherein the 2-5G dual band front end module is connected to a third filter switch bank configured to enable a 6G full band path, a 5G high bandpass filter, or a second 5G low bandpass filter.

2. The non-transitory machine-readable medium of claim 1, wherein the 2-5G dual front end module is connected to a fourth filter switch bank configured to enable a 2G application.

3. The non-transitory machine-readable medium of claim 1, wherein the 6G front end module and the 5G front end module each comply with an IEEE 802.11be standard.

4. The non-transitory machine-readable medium of claim 1, wherein the 6G narrow bandpass filter ranges up to 320 MHz for a low 6G application.

5. The non-transitory machine-readable medium of claim 1, wherein the 2-5G dual band front end module is configured to use the 6G full band path as a 6G scan radio.

6. The non-transitory machine-readable medium of claim 1, wherein the 6G front end module is configured to be operated in the 6G mode using the 6G high bandpass filter, the 6G wide bandpass filter, or the 6G narrow bandpass filter.

7. The non-transitory machine-readable medium of claim 1, wherein the 5G front end module is configured to be operated in the first split 5G/6G mode, such that operating in the 5G mode uses the first 5G low bandpass filter, the 5G wide bandpass filter, or the 5G narrow bandpass filter, and operating in the 6G mode uses the 6G low bandpass filter for a low 6G application.

8. A system, comprising:

a first radio communicating with a 6G front end module that is connected to a first filter switch bank configured to enable a 6G high bandpass filter, a 6G wide bandpass filter, or a 6G narrow bandpass filter;

a second radio communicating with a 5G front end module that is connected to a second filter switch bank configured to enable a 6G low bandpass filter, a first 5G low bandpass filter, a 5G wide bandpass filter, or a 5G narrow bandpass filter; and a third radio communicating with a 2-5G dual band front end module that is connected to a third filter switch bank configured to enable a 6G full band path, a 5G high bandpass filter, or a second 5G low bandpass filter.

9. The system of claim 8, wherein the 2-5G dual front end module is also connected to a fourth filter switch bank configured to enable a 2G application.

10. The system of claim 8, wherein the 6G front end module and the 5G front end module each comply with an IEEE 802.11be standard.

11. The system of claim 8, wherein the 6G narrow bandpass filter ranges up to 320 MHz for a low 6G application.

12. The system of claim 8, wherein the 6G low bandpass filter ranges up to 500 MHz for a low 6G application.

13. The system of claim 8, wherein the 2-5 g dual band front end module is configured to use the 6G full band path as a 6G scan radio.

14. The system of claim 8, wherein the 6G front end module is configured to be operated in a 6G mode using the 6G high bandpass filter, the 6G wide bandpass filter, or the 6G narrow bandpass filter.

15. The system of claim 8, wherein the 5G front end module is configured to be operated in a first split 5G/6G mode, such that operating in the 5G mode uses the first 5G low bandpass filter, the 5G wide bandpass filter, or the 5G narrow bandpass filter, and operating in the 6G mode uses the 6G low bandpass filter for a low 6G application.

16. The system of claim 8, wherein operating the 2-5G dual band front end module is configured to perform as a 2-5G 802.11be front end module such that the 2-5G dual band front end module is operated in a second split 5G/6G mode, in which operating in the 5G mode uses the 5G high bandpass filter or the second 5G low bandpass filter, and operating in the 6G mode uses the dedicated 5G receive path from the third radio to the 2-5G dual band front end module to receive using the 6G full band path.

17. The system of claim 8, wherein
the 5G front end module is configured to operate in a first split 5G/6G mode such that the 6G low bandpass filter is used for a low 6G application; and
the 2-5G dual band front end module is adapted to perform as a 2-5 GHz 802.11be front end module such that the 2-5G dual band front end module is configured to operate in a second split 5G/6G mode in which a dedicated 5G receive path from the third radio to the 2-5G dual band front end module is configured to receive using the 6G full band path.

18. The system of claim 8, wherein the system is an Access Point.

19. The non-transitory machine-readable medium of claim 8, wherein the 6G low bandpass filter ranges up to 500 MHz for a low 6G application.

20. The non-transitory machine-readable medium of claim 8, wherein operating the 2-5G dual band front end module is configured to perform as a 2-5G 802.11be front end module such that the 2-5G dual band front end module is operated in a second split 5G/6G mode, in which operating in the 5G mode uses the 5G high bandpass filter or the second 5G low bandpass filter, and operating in the 6G mode uses the dedicated 5G receive path from the third radio to the 2-5G dual band front end module to receive using the 6G full band path.

* * * * *